United States Patent Office 3,481,147
Patented Dec. 2, 1969

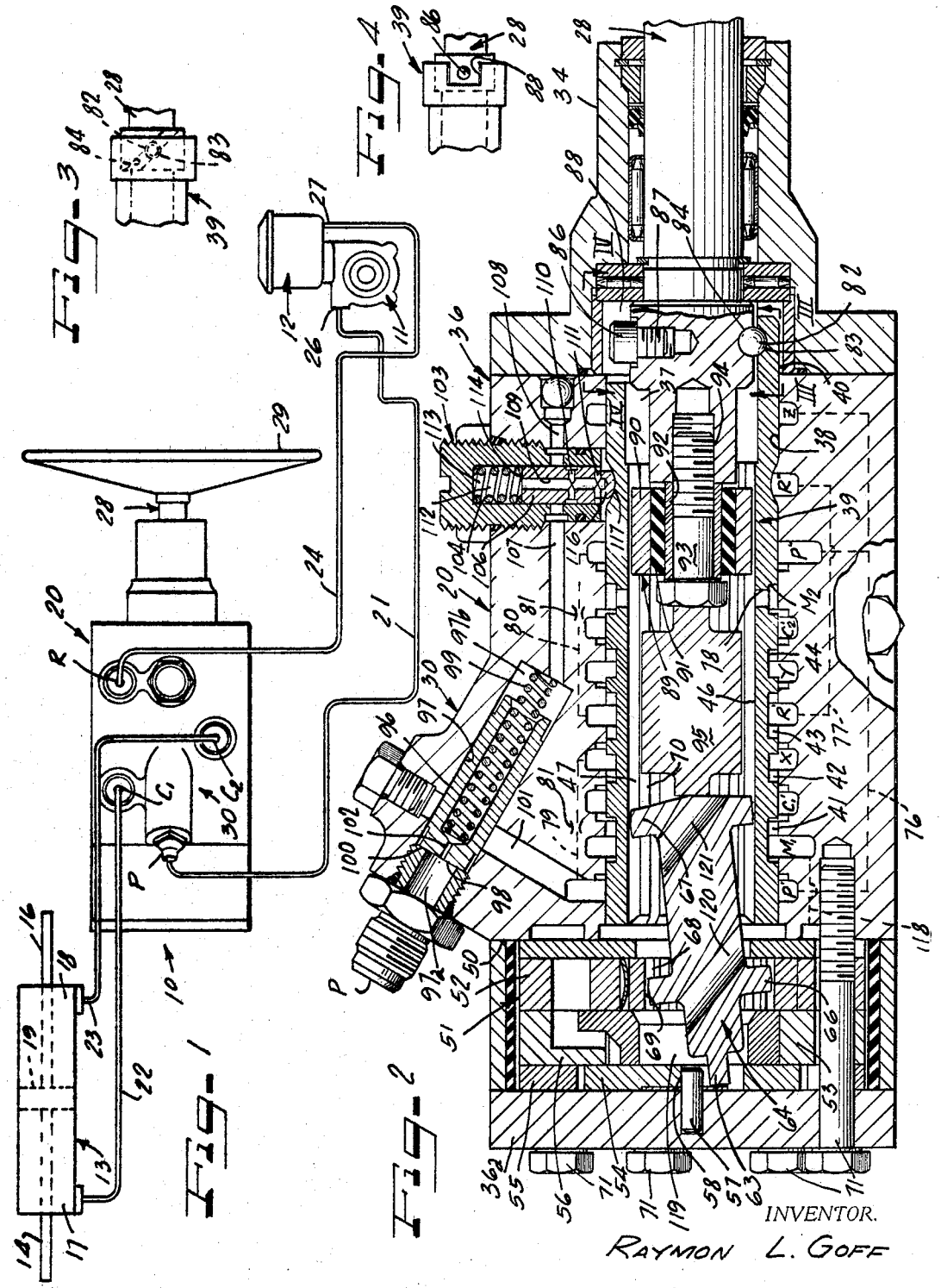

3,481,147
HYDRAULIC POWER SYSTEM
Raymon L. Goff, Lafayette, Ind., assignor to TRW Inc., Cleveland, Ohio, a corporation of Ohio
Filed Dec. 15, 1967, Ser. No. 691,038
Int. Cl. F15b 9/08; B62d 5/10
U.S. Cl. 60—52                          15 Claims

ABSTRACT OF THE DISCLOSURE

A hydraulically-operated power assist system including a fluid reservoir, a main power pump, a dual-acting working cylinder connected to the power pump for performing a work operation, and a fluid controller between the main power pump and the working cylinder for controlling the flow of fluid to and from the opposite ends of the working cylinder. A manually operable control device is mounted on and regulates the operation of the fluid controller. The fluid controller is of the one-piece, four line, metering-manual pumping, closed-center type and includes an admittance valve operated by a cam-operated pilot or dump valve for admitting pressurized fluid from the main power pump to the fluid controller only when the controller is operating to direct fluid to and from the working cylinder.

BACKGROUND OF THE INVENTION

This invention pertains generally to the field of hydraulic and more particularly to hydraulically-operated power assist systems utilizing a fluid controller between the main power pump and the working cylinder and including a mechanically actuated axially shiftable control valve.

Hydraulic power assist systems of this general description are known in the prior art, for example, in power steering systems. In such systems, the main power pump is generally directly connected to the engine of the vehicle on which the system is employed for continuous operation of the pump while the engine is running. The pressurized fluid (conventionally oil) circulates from the pump, through the fluid controller and back to the pump when the control valve of the fluid controller is in a neutral position. When the steering wheel is rotated the control valve shifts to an operating position, and the pressurized fluid is directed by the fluid controller to one of the two ends of the working cylinder.

Fluid controllers which are arranged to enable the pressurized fluid to flow through the control valve when the valve is in a neutral position are referred to as "open-center" controllers. This type controller is used in numerous applications because of its inherent by-pass feature when used in conjunction with a constantly operating fluid pump.

There are several disadvantages inherent in an open-center fluid controller, however. Because of the constant circulation of fluid through the control valve when the valve is in a neutral position, a hydraulic wedge of oil particles builds up on the valving surfaces of the control valve causing what is commonly known in the art as "stiction." This stiction is reflected in a lump or a momentary drag felt by the operator of the vehicle as he turns the steering wheel in arrangements wherein the steering wheel is directly coupled to the control valve for direct mechanical actuation of the valve.

By way of amplification, stiction, in applications of direct mechanical actuation of the control valve, imposes an initial drag on the steering wheel which not only increases the effort required in steering the vehicle but reduces precision in steering which may be reflected in over-steering.

SUMMARY OF THE INVENTION

In view of the foregoing, it is an object of this invention to reduce or eliminate stiction in the control valve by providing a fluid controller of the "closed-center" type in which an admittance valve blocks fluid flow to the control valve except when the steering wheel is turned to shift the control valve from the neutral position to an operating position. The control valve is mechanically coupled to the operating or steering wheel shaft and the operation of the admittance valve is controlled by a pilot valve which is also mechanically cam-actuated by the operating shaft through the control valve.

To this end the invention may be briefly summarized as comprising a fluid controller having an admittance valve between the fluid inlet connected to the main power pump and the control valve which operates in response to pressure differential across a movable poppet valve member. One end of the valve member communicates with the fluid inlet. The other end of the valve member resides in a chamber which communicates with the fluid inlet by way of a restricted orifice. The valve member is spring biased to a closed position, and as the fluid pressure in the chamber rises to the pressure of the fluid at the main inlet the valve member moves to a closed position, thus blocking flow to the control valve.

The chamber is in direct fluid communication with the pilot valve. An actuating member of the pilot valve is operated by the control valve to open the pilot valve when the control valve is moved from its neutral position toward an operating position. Opening of the pilot valve releases the pressure in the chamber behind the movable poppet valve member of the admittance valve, causing the valve member to move to an open position to directly communicate the main fluid inlet with the control valve. This occurs before the control valve has moved to an operating position and thus all throttling of the fluid through the fluid controller is accomplished, not by the admittance valve, but instead by the control valve. This avoids the problem of "chatter" which may be occasioned by attempted throttling through a poppet valve.

Another object of the invention is to prevent leakage of fluid through the control valve in the neutral position thereof not only by blocking flow between the main fluid inlet and the control valve, but also between the control valve and the main fluid outlet. To this end the pilot or dump valve is disposed in a fluid passage between the control valve and the main fluid outlet and in the neutral position of the control valve not only serves to build up the pressure in the chamber of the admittance valve, but also to block the passage between the control valve and the main fluid outlet.

The invention features mechanical actuation of both the control valve and the pilot valve by the operating shaft which mounts the steering wheel since the control valve is coupled to the operating shaft by means of a helical groove and ball arrangement and the pilot valve is operatively connected to the control valve by means of a cam and cam follower arrangement. This mechanical actuation of the control valve and the pilot valve assures quick response and precision in steering.

Many other features, advantages and additional objects of the present invention will become manifest to those versed in the art upon making reference to the detailed description which follows and the accompanying sheet of drawings in which a preferred structural embodiment incorporating the principles of the present invention is shown by way of illustrative example only.

BRIEF DESCRIPTION OF THE DRAWING

FIGURE 1 is a generally diagrammatic view of a power steering system incorporating the principles of the present invention.

FIGURE 2 is a sectional view used in the steering system shown in FIGURE 1.

FIGURE 3 is a fragmentary sectional view taken along lines III—IIII of FIGURE 2 in which parts are removed to show the helical groove and ball connection between the operating shaft and the control valve.

FIGURE 4 is similar to FIGURE 3 and taken along lines IV—IV of FIGURE 2 but shows a rotational driving connection between the operating shaft and the control valve.

DESCRIPTION OF THE PREFERRED EMBODIMENT

Although the principles of the present invention are of utility in any hydraulically-operated power assist system, a particularly useful application is made to power steering systems and in the drawing the invention is illustrated in association with a power steering system for dirigible vehicles. The various components of the system 10 include a main power fluid pump 11 which may be directly connected to the engine of the vehicle in which the system 10 is incorporated so that the pump 11 operates continuously during operation of the engine.

The preferred operating fluid for the system 10 is oil and the pump 11 is selected accordingly. An oil reservoir 12 is mounted on the suction side of the pump 11 for the obvious reasons.

The pump 11 is connected hydraulically to a working cylinder 13. The steered wheels of the vehicle are connected either directly or through intermediate linkages to reciprocable rods 14 and 16 which extend respectively from opposite ends 17 and 18 of the cylinder 13. A piston 19 is slidably carried within the cylinder 13 and as the opposite ends 17 and 18 are connected alternatively to the discharge side of the pump 11 the piston 19 and the rods 14 and 16 move back and forth correspondingly to turn the steered wheels. Since the piston 19 is positively moved in opposite directions the cylinder 13 may be referred to as a dual-acting hydraulic cylinder.

The flow of pressurized fluid from the pump 11 to the cylinder 13 is controlled by a fluid controller indicated generally at reference numeral 20. In the hydraulic circuitry of the system 10 the controller 20 is mounted between the pump 11 and the cylinder 13 and connected thereto by fluid lines 21–24.

Line 21 connects a discharge side 26 of the pump 11 with a main fluid inlet P of the fluid controller 20. Lines 22 and 23 communicate the ends 17 and 18 of the cylinder 13 with a pair of cylinder ports $C_1$ and $C_2$ and line 24 connects a main fluid outlet or return R of the fluid controller 20 to a suction side 27 of the pump 11.

A rotatable operating shaft 28 extends from one end of the fluid controller 20. The shaft 28 is the actuating member of the fluid controller 20 and rotation of the shaft 28 serves to effect communication of one of the ends 17 and 18 of the cylinder 13 with the discharge side 26 of the pump 11, the particular end of the cylinder 13 communicated depending upon the direction of rotation of the shaft 28. A conventional steering wheel 29 may be mounted on the end of the shaft 28 to facilitate rotation in the usual manner.

When the shaft 28 is at rest, that is, when it is not turning in either direction, fluid flow through the controller 20 is blocked by an admittance valve 30 and the fluid merely circulates through the usual relief valve or by-pass disposed within the pump 11. The by-pass valve is set at operating pressure and thus the fluid at the main inlet P of the fluid controller 20 is always maintained at operating pressure.

Other hydraulically operated apparatus such as power brakes, hydraulic lifts and the like may also be operated by the main power pump 11 by connecting such devices in parallel with the fluid controller 20. It is also noted that the power system 10 may be conveniently utilized in association with systems other than power steering systems which include hydraulically operated devices. The invention finds particular utility in the field of power steering systems, however, because of the desirability of minimum effort and maximum precision in the operation and control of such systems.

Again referring to the drawing, the fluid controlled 20 may be more particularly characterized as comprising a housing or casing 36 which has formed therein a cylindrical bore 37 having a bore wall 38. A series of axially spaced circumferential grooves are formed in the bore wall 38 as indicated at reference characters $P'$, $M_1$, $C_1'$, $X$, $R'$, $Y$, $C_2'$, $P''$, $R''$ and $Z$.

The control valve of the fluid controller 20 which directs the flow of fluid between lines 21–24 (FIGURE 1) comprises a tubular sleeve or spool valve indicated at 39. The valve 39 has an outer wall 40 in which are formed a series of axially spaced circumferentially continuous grooves 41–45, and an inner wall 46 which forms an internal chamber 47.

The operating shaft 28, which may be knurled and threaded at the end thereof to facilitate mounting of the steering wheel 29, enters the casing 36 through an end portion 34 thereof and extends into the chamber 47 in the hollow of the control valve 39.

Disposed between an end wall 50 of the casing 36 and an end cap 36a is a metering-pumping gear set indicated generally at reference numeral 51 which in the illustrated embodiment comprises a pair of hypocycloidal gears one of which is indicated at reference numeral 52 and the other of which is indicated at 53.

Gear member 52 is internally toothed and gear member 53 is externally toothed and disposed within member 52. Gear member 52 has one more tooth than does member 53 and as a consequence the gear members are rotatable relative to one another. Because of the configuration and meshing relation of gear members 52 and 53 relative rotation therebetween also causes relative orbital movement. The orbital speed is greater than the relative speed of rotation by a factor equal to the number of teeth of the internally toothed member 52.

During relative orbital and rotational movement of the gears 52 and 53 a succession of alternately expanding and contracting fluid chambers are formed between the teeth or lobes of the gears. The externally toothed member 53, which in the embodiment illustrated may be referred to as a "star" or rotor, is eccentrically disposed with respect to the internally toothed member 52, which may be referred to as a stator. The overall gear arrangement 51 may be conveniently referred to as a gerotor gear set.

When the sleeve valve 39 is moved axially from a neutral position to one of its operating positions, the pressurized fluid flowing from the main pump 11 to the cylinder 13 flows through the gerotor gear set 51 to operate the gears 52 and 53 as a follow-up mechanism with respect to the valve 39 and as a metering mechanism with respect to the fluid. The fluid is directed in sequence into and out of the fluid chambers between the teeth of the gear members 52 and 53 by means of a commutator valve indicated generally at reference numeral 54 residing within a valve housing 55. A spacer plate 56 separates the gear set 51 from the commutator valve 54.

Further concerning commutation, a pin 57 extends inwardly from the end cap 36a and is received in a bore 58 formed in the commutator valve 54. In the embodiment illustrated the commutator valve 54 is driven for rotation at the orbit speed of the star or gear member 53 and is drivingly connected thereto by means of a finger 63 which protrudes from a wobble shaft 64. The wobble shaft 64 is generally cylindrically shaped and comprises axially spaced gear-toothed portions 66 and 67. The portion 66 engages in meshing relation complementarily shaped gear teeth 68 formed in a bore 69 of the gear member 53, and the toothed portion 67 meshingly engages with gear teeth 70 formed on the inner wall 46 of the control valve 39. The finger 63 is received in a slot 71 formed in the commutator valve 54 in eccentric relation to the center bore 58.

Operation of the gerotor gear set 51 to cause orbital and rotational movement of the star 53 has the effect of rotating the wobble shaft 64 at the end portion 67 thereof and both rotating and orbiting the shaft 64 at the toothed portion 66 as well as at the finger 63. The orbiting movement of the finger 63 about the stationary pin 57 rotates the commutator valve 54 around the pin 57 at the orbit speed of the star 53. The control valve 39 is rotated by the wobble shaft 64 at the rotational speed of the star 53.

Additional details of the exemplary commutator valve 54, the wobble shaft 64 and the passageways through which the fluid flows through the commutator valve and to and from the gerotor gear set 51 are described in abundance in White, Jr. et al. U.S. Patent No. 3,288,034.

The end cap 36a, the commutator valve 54, the valve housing 55, the spacer plate 56 and the gerotor gear set 51 are maintained in assembled relation with the housing 36 by means of a plurality of axially extending assembly bolts 71 which extend through registered bores formed in the aforementioned components.

Each of the ports P, R, $C_1$ and $C_2$ shown in FIGURE 1 communicates with one of the grooves formed in the bore wall 38 of the housing 36. For example, the main fluid inlet P communicates with groove P', Ports $C_1$ and $C_2$ communicate with grooves $C_1'$ and $C_2'$ and the main fluid outlet or return R communicates with groove R'.

In addition the grooves P' and P" communicate with each other as well as with groove Z through a passageway indicated by the dashed lines at reference numeral 76 and the grooves R' and R" communicate with each other through passageways 77. The groove $M_2$ communicates with the interior of the control valve 39 through a passageway 78.

In addition groove X communicates with groove P' through a passageway 79 and groove Y communicates with groove P" through a passageway 80. Both of these passageways have restrictive orifices as indicated at reference numerals 81.

The grooves identified at reference characters X, Y and Z may be referred to as "pressure dams" since they are subjected to high static pressure and are disposed between adjacent active or flow-through grooves, the pressure of one of such active grooves being substantially less than the pressure of the next adjacent active groove.

The control valve 39 is shifted axially in response to rotation of the operating shaft 28. This axial shifting effected by means of a helical groove and ball arrangement wherein a spherical ball 82 resides partially in a frustospherical recess 83 formed in the inner wall 46 of the control valve 39, and partially in a helical groove 84 formed in the operating shaft 28. In addition the head 86 of a threaded pin 87 projects into a slot 88 formed in the valve 39 for joint rotation of the operating shaft 28 and the control valve 39 after the operating shaft 28 has rotated through a predetermined angle relative to the control valve 39 determined by the circumferential width of the slot 88.

Centering of the control valve 39 with respect to the operating shaft 28 (that is, return of the control valve 39 to its neutral position in the absence of a turning force on the shaft 28) is accomplished by a torsion member indicated generally at reference numeral 89. This torsion member 89 serves in the nature of a lost-motion and comprises an outer annular member 90 on which gear teeth are formed to mesh with the internal gear teeth 70 of the control valve 39, a resilient annular member 91 and a bushing 92. The three members 90–92 may be bonded together or otherwise connected in fixed assembly to form the unitary torsion member 89. A threaded stud such as a bolt or the like fastener indicated at 93 extends through the bore of the bushing 92 and is seated in a complementarily threaded bore 94 of the operating shaft 28.

The resilient member 91 may be constituted of an elastomeric material or the like to enable the outer member 90 to rotate to a limited extent relative to the bushing 92 and to the operating shaft 28. This feature is particularly significant in instances of failure of the main power pump 11. In such circumstances the fluid controller 20 is utilized to provide manual steering and the gerotor gear set 51 is utilized as a pump as it is rotated by the operating shaft 28 through the torsion member 89, the control valve 39 and the wobble shaft 64. It is further noted that a spacer block 95 is mounted in the bore of the control valve 39 between the wobble shaft 64 and the stud 93 to maintain proper spacing of the parts. The block 95 is relatively rotatable with respect to both the wobble shaft 64 and the stud 93.

The admittance valve 30 is interposed in the housing 36 between the main fluid inlet P and the groove P' and comprises a poppet valve 96 slidably carried in a bore 97. One end 98 of the valve member 96 is biased by means of a spring 99 against a valve seat 100 to block flow between an inlet end 97a of the bore 97 and another passage 101 which communicates the bore 97 with the groove P'. An opposite end 97b of the bore 97 comprises a chamber in communication with end 97a through a restrictive orifice 102 formed in the valve member 96.

A pilot or dump valve 103 also disposed in the housing 36 comprises a bore 104 in which is slidably carried another poppet valve 106. The bore 104 communicates with the chamber 97b of the admittance valve 30 through a passage 107 and communicates with the main fluid outlet through a passage 108. In addition, the bore 104 communicates with the groove R" formed in the bore wall 38.

A longitudinal bore 109 and a pair of cross bores 110 and 111 are formed in the valve member 106 and communicate with a chamber portion 112 of the bore 104 above the valve member 106. A helical spring 113 is bottomed against an upper end 114 of the valve member 106 for biasing a lower end thereof against the outer wall 40 of the control valve 39.

The bottom end 116 of the valve member 106 is arcuately shaped and abuts a complementarily shaped portion 117 of the valve member 39. As the control valve 39 shifts axially in the housing bore 38 the arcuate surface 117 serves as a cam to urge the valve member 106 upwardly in the bore 104 to communicate the chamber 97b of the admittance valve 30 and the groove R" with the main fluid outlet R.

In order to more fully describe the invention the operation of the fluid controller 20 will be explained in connection with its function in the power steering system shown in FIGURE 1, although it should be understood that the controller 20 operates similarly when utilized to control the operation of other pressurized fluid operated devices.

In the absence of a torque being applied to the operating shaft 28 by the steering wheel 29 or the like, the relative disposition of the operating shaft 28, the control valve 39, the admittance valve 30, the pilot valve 103 and the grooves formed in the bore wall 38 is as shown in FIGURE 2. Assuming that the main fluid pump 11 is operating, pressurized fluid is directed to the port P of the fluid controller 20 and to the chamber 97a of the admittance valve 30. A portion of this fluid is admitted through the restricted orifice 102 into the chamber 97b behind the valve member 96 so that shortly an equal pressure obtains on both sides of the valve member 96. The spring 99 biases the valve member 96 against the valve seat 100, thereby blocking flow of pressurized fluid through the passage 101 to the groove P'.

Assume now that a clockwise torque is applied to the operating shaft 28. The control valve 39 cannot rotate at this time since it is connected for joint rotation to the star 53 through the wobble shaft 64 and the star 53 is unable to rotate since the gerotor gear set 51 is presently hydraulically locked. The control shaft 28 is able to rotate relative to the control valve 39, however, because of the resilient member 91 in the gear 89. This relative rotation between the operating or control shaft 28 and the control valve 39 tends to shift the control valve 39 axially leftwardly as viewed in FIGURE 2 since the ball 82 riding in the helical groove 84 tends to ride in the groove in a leftward direction relative to the operating shaft 28.

As the control valve 39 begins to move leftwardly, the valve member 106 of the pilot valve 103 is cammed upwardly so that the cross passage 110 communicates with passages 107 and 108. This results in immediate communication between the chamber 97b of the admittance valve 30 and the groove R″ with the main fluid outlet R. Thus the pressure in chamber 97b is released and the fluid therein dumped, causing the valve member 96 to immediately move to an open position, thereby communicating the main fluid inlet P with the groove P′.

Further axial shifting of the control valve 39 causes the groove P′ to communicate with groove $M_1$ through the groove 41 formed in the control valve 39. The pressurized fluid is then directed from groove P′ through groove $M_1$ and thence through a passageway 118 into direct fluid communication with the commutator valve 54 at the lefthand side of the fluid controller 20.

The presurized fluid is directed by the commutator valve 54 to and from the fluid chambers formed between the stator 52 and the rotor 53 of the gerotor gear set 51 to cause the rotor 53 to orbit and rotate within the stator 52. The pressurized fluid then passes from the gear set 51 to a bore 119 formed in the spacer plate 56, through passages 120 and 121 formed in the wobble shaft 64 and thence to radial passages 78 extending through the control valve 39 to the grooves $M_2$.

In this axially leftward position of the control valve 39, groove $M_2$ communicates with groove $C_2'$ which, as noted is connected to the oil line 23 of FIGURE 1 to the righthand side 18 of the hydraulic cylinder 13 to urge the piston 19 leftwardly and to turn the steered wheels accordingly.

Fluid from the lefthand side 17 of the cylinder 13 is forced through oil line 22 to the port $C_1$ and thence to the groove $C_1'$. In the leftward position of the control shaft 39, groove $C_1'$ communicates with groove R′ through the groove or pressure dam X and, as illustrated in FIGURE 2, the groove R′ communicates with groove R″ which in turn is connected to the main fluid outlet R. The fluid thus passes through the oil line 24 to the reservoir 12 and to the sucton side 27 of the main fluid pump 11.

Rotation of the operating shaft 28 in an opposite direction causes the control valve 39 to shift rightwardly as viewed in FIGURE 2 after the admittance valve 30 has moved to an open position. This rightward axial shifting of the control valve 39 communicates grove P′ and groove P″ with the groove $M_2$. From groove $M_2$ the pressurized fluid from the discharge side of the pump 11 passes through the radial passages 78 into the interior of the control valve 39, thence through passages 120 and 121 of the wobble shaft 64 to the commutator valve 54 and the gerotor gear set 51. This reverse flow of pressurized fluid through the gerotor gear set 51 causes the rotor 53 to rotate and orbit in a direction opposite to that which obtains when the control valve 39 is shifted axially leftwardly.

The pressurized fluid thence flows through passage 118 into groove $M_1$ and thence to groove $C_1'$ through groove 41 and thence to the left side 17 of the hydraulic cylinder 13 to move the piston 19 rightwardly.

The pressurized fluid from the righthand side 18 of the cylinder 13 passes through the oil line 23 to the port $C_2$, thence to groove $C_2'$ which communicates with groove R′ through the pressure dam groove Y. From groove R′ the fluid flows to groove R″ through passage 77 and thence to the main fluid outlet R through the pilot valve member 106 and the passage 108.

Regardless of the direction of rotation of the operating shaft 28, rotation of the star or gear member 53 of the gerotor gear set 51 tends to rotate the control valve 39 through the wobble shaft 64 relative to the operating shaft 28 to tend to return the control valve 39 to the neutral position thereof. This just as soon as the torque is released from the operating shaft 28 the continued rotation of the control valve 39 relative to the operating shaft 28 caused by the star 53 tends to return the control valve 39 to the neutral position thereof through the helical groove and ball arrangement presented by the spherical ball 82, the recess 83 and the helical groove 84.

Since the pilot valve 103 is always closed when the control valve 39 is in the neutral position thereof, the admittance valve 30 is also closed to prevent the flow of pressurized fluid through the passage 101 to the groove P′. This "closed-center" type construction avoids the free circulation of the pressurized fluid through the various grooves of the bore 38 and the control valve 39 and eliminates the deposit of impurities in the grooves and along the mating faces of the control valve 39 and the bore 38. This reduces the problem of stiction and results in highly improved steering characteristics of the power steering system 10.

The purpose of the pressure dams X, Y and Z is to reduce leakage of fluid between the outer wall 40 of the control valve 39 and the bore wall 38. Grooves X and Y serve both as pressure dams and as conduits between adjacent grooves depending upon the direction of axial shifting of the control valve 39 whereas groove Z only serves as a pressure dam.

It is noted that all of the throttling of fluid through the fluid controller 20 is accomplished by the control valve 39, since the admittance valve 30 is opened fully even before the control valve 39 reaches an operating position, and remains open until the control valve 39 returns again almost completely to the neutral position thereof.

Although minor modifications might be suggested by those versed in the art it should be understood that I wish to embody within the scope of the patent warranted hereon all such modifications as reasonably come within the scope of my contribution to the art.

I claim as my invention:

1. A fluid control valve comprising
    a housing,
    a bore wall forming a bore in said housing,
    a fluid inlet for connection to a source of pressurized fluid,
    a fluid outlet for returning the fluid to the source and a pair of cylinder ports in said housing,
    an axially shiftable spool valve in said bore having a peripheral wall in sliding engagement with said bore wall,
    means in said walls forming axially spaced circumferential grooves including an inlet groove, an outlet groove and a pair of cylinder grooves in communication respectively with said inlet, said outlet and said cylinder ports,
    an admittance valve between said fluid inlet and said inlet groove for blocking communication therebetween and a pilot valve between said fluid outlet and said outlet groove for blocking communication therebetween and for controlling the operation of said admittance valve,
    means for shifting said spool valve axially from a neutral position at which communication between said grooves is blocked to an operating position at which said grooves communicate with one another to provide fluid flow from said fluid inlet through said cylinder ports to said fluid outlet,
    pilot valve operating means responsive to the shifting of said spool valve from said neutral position toward an operating position thereof for opening said pilot valve to communicate said outlet groove with said fluid outlet, and means operatively interconnecting said pilot valve and said admittance valve for opening said admittance valve in response to the opening of said pilot valve.

2. The fluid control valve as defined in claim 1 wherein said spool valve shifting means comprises
a control shaft mounted for rotation on said housing, and cooperating screw means on said spool valve and on said control shaft for relative axial shifting thereof in response to relative rotation therebetween.

3. The fluid control valve as defined in claim 2 wherein said pilot valve operating means comprises
cooperating cam and cam follower means formed on said spool and said pilot valves.

4. A closed-center fluid controller for alternatively pressurizing the opposite ends of a dual-acting pressurized fluid operated hydraulic device comprising
a housing having a bore therein and openings in communication with said bore including a main fluid inlet for connection to the discharge side of a source of pressurized fluid,
a main fluid outlet for connection to the suction side of the source and a pair of ports for connection to the opposite ends of the hydraulic device,
a metering unit in said housing including a rotatable gear, means communicating said metering unit with said bore,
a rotatable spool valve shiftable axially from a neutral position to first and second operating positions located respectively on opposite sides of said neutral position,
said spool valve being effective to direct fluid from said inlet to said outlet in opposite directions through said metering unit and said ports as said spool valve is moved between said first and second operating positions,
said spool valve being effective to block fluid from said inlet to said metering unit and said ports in the neutral position thereof,
said gear being rotated by fluid flowing therethrough in a direction corresponding to the direction of fluid flow,
an operating shaft rotatably carried in said housing,
means mechanically interconnecting said operating shaft and said spool valve for shifting said spool valve in opposite directions from said neutral position to said first and second operating positions in response to rotation of said shaft in opposite directions,
means connecting said gear and said spool valve for joint rotation for effecting axial shifting of said spool valve toward the neutral position thereof,
an admittance valve between said main fluid inlet and said bore for blocking fluid flow therebetween, and
valve actuating means operatively connected to said admittance valve for opening closing said admittance valve in response to the shifting of said spool valve away from and toward the neutral position thereof, respectively.

5. The fluid controller as defined in claim 4 wherein said valve actuating means opens said admittance valve before said spool valve communicates said main fluid inlet with said metering unit and the said ports.

6. The fluid controller as defined in claim 4 wherein said admittance valve comprises
a passage communicating said main fluid inlet and said bore,
a valve seat in said passage,
a valve chamber,
a valve member having first and second oppositely facing motive surfaces disposed respectively in said passage and in said chamber whereby fluid pressure in said passage tends to unseat said valve member and fluid pressure in said chamber tends to seat said valve member,
means biasing said valve member toward said valve seat, and restricted orifice means communicating said passage and said chamber,
said valve actuating means comprising a dump valve effective to open said chamber to reduce the pressure therein upon movement of said spool valve from the neutral position thereof.

7. The fluid controller as defined in claim 6 and including means communicating said dump valve with said main fluid outlet.

8. The fluid controller as defined in claim 4 wherein said valve actuating means comprises
a dump valve communicating with said first chamber and including a valve arm movable to open and close the dump valve,
means for biasing said valve arm into engagement with said spool valve, and
means forming an axially extending cam surface on said spool valve for moving said valve arm in response to axial shifting of said spool valve.

9. A closed-center metering type fluid controller for controlling the flow of fluid to a pressurized-fluid operated hydraulic device comprising
a housing having a bore therein and a fluid inlet for connection to the discharge side of a source of pressurized fluid,
a passage communicating said inlet and said bore,
a pair of ports for directing fluid to and from the hydraulic device and in communication with said bore and a fluid outlet for connection to the suction side of the source in fluid communication with said bore,
fluid meter means in said housing including a pair of meshing gears one of which is rotatable with respect to the other for forming a succession of alternately expanding and contracting fluid chambers therebetween,
a control valve in said bore shiftable axially in opposite directions from a neutral position to first and second operating positions for directing fluid from said inlet and in series through said fluid chambers and said ports in opposite directions corresponding to said first and second operating positions and then to said fluid outlet,
fluid flow through said chambers causing relative rotation of said gears in a direction corresponding to the direction of fluid flow therethrough,
said control valve in the neutral position thereof blocking fluid flow to said fluid chambers,
a control shaft rotatably mounted on said housing, first coupling means mechanically interconnecting said control shaft and said control valve for shifting said control valve axially between the operating positions thereof in response to rotation of said control shaft in opposite directions,
means connecting said rotatable gear and said control shaft for joint rotation tending to restore said control valve to said neutral position thereof,
admittance valve means in said housing for blocking fluid communication between said inlet and said bore comprising,
a valve seat in said passage,
a valve chamber communicating with said passage,
an admittance valve member having opposite end portions forming motive surfaces communicating respectively with said passage and with said valve chamber and movable in said passage between open and closed positions with respect to said seat in response to variations in pressure differentials across said motive surfaces,
means biasing said admittance valve member to the closed position thereof,
restrictive orifice means communicating said passage and said valve chamber for bleeding pressurized fluid into said valve chamber to move said admittance valve member to the closed position thereof, dump valve means in fluid communication with said valve chamber comprising, a dump valve member movable between a first position for closing said valve chamber to build up the pressure therein and a second position for opening said valve chamber to release the fluid and to reduce the pressure therein, and second coupling means mechanically interconnecting said dump valve member and said control valve for moving said dump valve member to the second position thereof as said control valve is mechanically shifted by said operating shaft from the neutral to one of the operating positions thereof for releasing the pressure in said valve chamber causing said admittance valve member to move to the open position thereof, whereby said admittance valve member blocks fluid communication between said fluid inlet and said bore until said control valve is shifted from the neutral position thereof.

10. The fluid controller as defined in claim 9 wherein said dump valve blocks communication between said bore and said fluid outlet in the closed position thereof.

11. A hydrostatic power steering system including in combination a power pump,
a reservoir,
a metering pump,
a piston and cylinder arrangement for moving vehicle wheels and valving means,
said valving means including a housing having a bore,
a movable control valve in said bore,
wall means defining porting on said control valve and in said bore,
fluid conduit means connecting opposite sides of said metering pump to said porting,
fluid conduit means connecting opposite sides of said piston and cylinder arrangement to said porting,
fluid conduit means connecting said reservoir to said porting,
an admittance valve in said housing having inlet and outlet sides,
fluid conduit means connecting said inlet side of said admittance valve to said power pump and said outlet side to said porting,
said admittance valve in its normally closed position preventing fluid from passing from said power pump to said porting,
a fluid chamber adjacent said admittance valve,
a first fluid passage connecting said fluid chamber to said inlet side of said admittance valve,
fluid pressure in said fluid chamber admitted through said first fluid passage from said power pump normally maintaining said admittance valve closed,
a pilot valve in said housing connecting said fluid chamber to said porting,
means acting between said movable control valve and said pilot valve whereby movement of said control valve causes opening of said pilot valve,
means for moving said contact valve comprising a rotatable shaft in said housing and means mechanically interconnecting said control valve and said shaft, opening of said pilot valve upon movement of said control valve causing reduction of fluid pressure in said fluid chamber and opening of said admittance valve because of fluid pressure from said power pump acting on said admittance valve from the the inlet side thereof with passage of fluid pressure from said power pump to said porting, said movement of said control valve causing power pump fluid to be passed through said porting to said metering pump and then to said piston and cylinder arrangement and return fluid from said piston and cylinder arrangement is passed through said porting and back to said reservoir.

12. A hydrostatic power steering system as claimed in claim 11 wherein said means which act between said control valve and pilot valve to open said pilot valve comprises cam means.

13. A hydrostatic power steering system as claimed in claim 11 wherein said control valve is movably axially in said bore and wherein said mechanically interconnecting means comprises means forming cooperating helical groove and ball means in said shaft and in said valve member.

14. The method of control which includes the steps of axially shifting a peripherally grooved spool valve in response to rotation of a control shaft mechanically connected to said spool valve, moving a cam operated pilot valve in response to such axial shifting of said spool valve to vent fluid from the downstream side of an admittance valve to the return of a pump, whereby differential pressure will open the admittance valve, and directing fluid discharged from the pump through said admittance valve to channels in the spool valve for throttling to a point of utilization.

15. In a hydraulic system, an axially shiftable peripherally grooved spool valve member,
rotatable means for mechanically axially shifting said spool valve,
an admittance valve connected to a source of fluid at increased pressure,
a cam operated pilot valve actuated by axial shifting of said spool valve and operable to vent fluid from the downstream side of said admittance valve to a source return, whereby differential pressure will open said admittance valve, and
means forming passage means connecting said admittance valve to said spool valve, whereby pressurized fluid will be throttled by said spool valve to a point of utilization.

References Cited

UNITED STATES PATENTS

| | | | |
|---|---|---|---|
| 2,414,451 | 1/1947 | Christensen | 60—54.5 XR |
| 2,969,044 | 1/1961 | Leduc | 91—368 |
| 2,968,316 | 1/1961 | Schultz | 60—52.5 XR |
| 3,358,711 | 12/1967 | Pruvot | 60—52.5 XR |

EDGAR W. GEOGHEGAN, Primary Examiner

U.S. Cl. X.R.

91—375; 180—79.2